July 25, 1967    H. E. WEILER    3,332,131
SLEEVE FOR FIBERGLASS RESIN ROLLERS
Filed Sept. 29, 1966
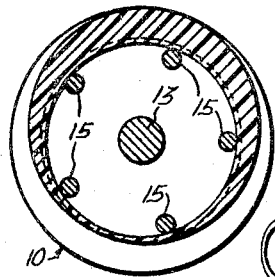
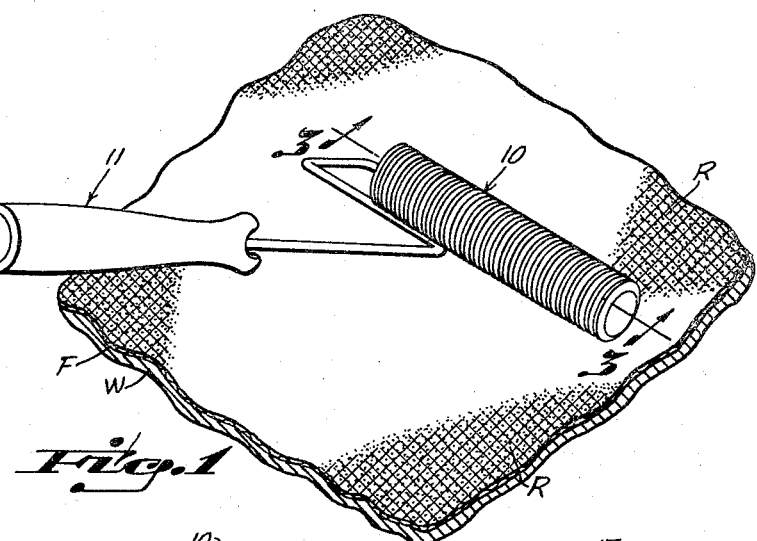
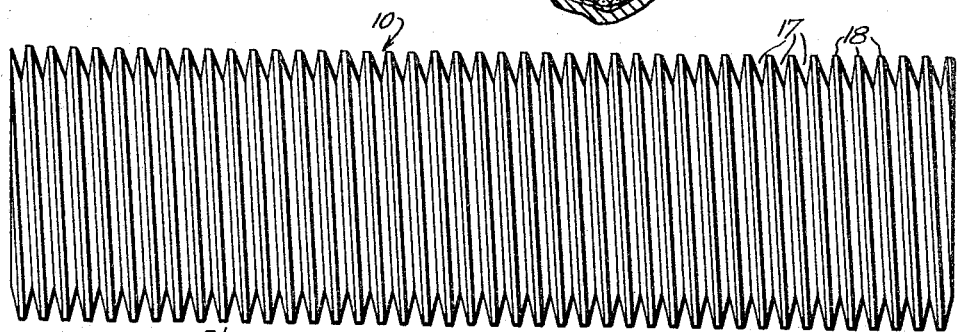
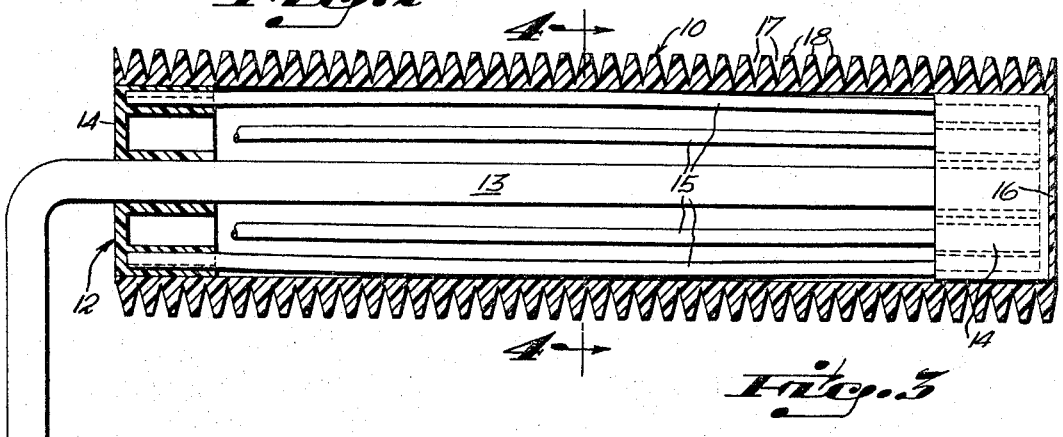
INVENTOR.
HOWARD E. WEILER
BY E. H. Schmidt,
ATTORNEY.

United States Patent Office 3,332,131
Patented July 25, 1967

3,332,131
SLEEVE FOR FIBERGLASS RESIN ROLLERS
Howard E. Weiler, 7350 Belle Meade Island Drive,
Miami, Fla. 33186
Filed Sept. 29, 1966, Ser. No. 582,880
4 Claims. (Cl. 29—121)

ABSTRACT OF THE DISCLOSURE

A replaceable resin roller of a synthetic plastic material in the form of a cylindrical sleeve closed by an integral end wall at one end and having a V-shaped groove extending spirally along its outer periphery.

---

This invention relates generally to roller type tools and is directed particularly to a disposable roller sleeve for use with roller tools in the maufacture of fiberglass reinforced molded synthetic plastic products.

In the manufacture of fibrous glass reinforced plastic products such as boats, aircraft panels, building construction members, furniture, bath tubs, swimming pools, automobile body panels and the like sizable items, layers of fibrous glass reinforcing material, such as of chopped glass strand mats or fabric made of woven glass yarn or rovings, are placed by hand against the mold surface and resin is added either by spraying or bushing after each layer is located. Since it is important that no air be trapped between layers and in the reinforcing material itself, hand roller tools having wide roller members are rolled over each layer after being placed to express trapped air. Presently, ordinary paint rollers are used for this purpose, or, for more lasting use, metal rollers within which grooves of rectangular cross-section are formed along their lengths to permit resin flow and thereby prevent forcing out of the resin in front of the roller. While such metal rollers are generally satisfactory in performance, they are expensive, and have limited life because the theromsetting resin builds up in the grooves, clogging them and thereby rendering them unsatisfactory in operation. Customarily when this happens, which may occur every few weeks in a busy molded plastics manufacturing plant, the clogged metal rollers are burned in a hot fire to burn out the hardened plastic. This can only be done a few times before the metal itself is sufficiently destroyed to render the roller useless.

It is accordingly the principal object of this invention to provide an improved sleeve for fiberglass resin rollers that obviates the above-described deficiencies of rollers heretofore used.

Another object is to provide a roller that is inexpensive enough to be disposed of as soon as it shows signs of inefficiency because of clogging, thereby eliminating the necessity of special treatment for renewal such as the burning of metal rollers, and which will be unusually effective in rolling out air bubbles with minimum disturbance of resin distribution between and within reinforcing layers of glass matting or fabric.

A more particular object is to provide a roller of the character described above which is adaptable to mass production by blow molding techniques of a plastic material such as nylon, styrene, polypropylene, polyethylene and the like, the volume of plastic required being kept to a minimum for greatest economy.

Yet another object of the invention is to provide an expendable roller of the character described which can be used with a roller handle of the type commonly used with paint rollers, thereby effecting further economy in the over-all tool cost in the rolling process.

Other objects, features and advantages of the invention will be apparent from the following description when read with reference to the accompanying drawings.

In the drawings, wherein like reference numerals denote corresponding parts throughout the several views:

FIG. 1 is a perspective view illustrating use and operation of the resin roller sleeve;

FIG. 2 is a front elevational view of the sleeve embodying the invention, shown separately;

FIG. 3 is a longitudinal cross-sectional view taken along the line 3—3 of FIG. 1 and illustrating constructional details of the sleeve and its associated handle; and FIG. 4 is a transverse cross-sectional view taken along the line 4—4 of FIG. 3 in the direction of the arrows.

Referring now in detail to the drawing, 10 designates, generally, a resin roller sleeve embodying the invention, the same being shown removably fitted to a roller handle 11. As a means for rotatably supporting the sleeve 10, the roller handle 11 is provided with a cage 12 journalled on a transverse rod portion 13 of said handle. The cage 12 comprises opposed, cylindrical end wheels 14, the inner, facing ends of which are interjoined by a plurality of peripherally-arranged equi-distantly spaced cage rods 15 which are bowed outwardly slightly beyond the diametrical extent of said end wheels.

The sleeve 10 is preferably formed by blow-molding of a somewhat flexible synthetic plastic such as polyethylene, and is integrally formed with an end wall portion 16 at one end. The cylindrical wall of the sleeve 10 is relatively thick as compared with the end wall portion 16, and is formed therealong with a spiral groove 17 of triangular cross-section, so spaced as to define about the outer periphery of said sleeve a spiral land 18 having a width which preferably is one-third or less of the groove width.

As a practical matter, it has been found that for a roller having an over-all diameter of about 2 inches and a length of from about 7 to 12 inches, a spiral pitch of about six groove turns 17 per inch has proved to be satisfactory for working out trapped air without disturbing resin distribution in the glass fiber layers being worked. It is to be noted that the depth of the spiral groove 17 extends just short of the full wall thickness of the sleeve 10 for maximum economy in the manufacture of the sleeve. The depth of the groove, moreover, being about one-quarter inch, has been found sufficient to allow flow-through of resin for minimum disturbance or redistribution thereof while at the same time working out air bubbles.

An important feature of my invention resides in the provision of the end wall portion 16 at the outer end of the sleeve 10, which prevents resin entering between the sleeve and the roller and hardening. Replacement of the sleeve whenever necessary can therefore be accomplished with a minimum of difficulty due to hardened resin.

While I have illustrated and described herein a particular form of roller sleeve it is to be understood that this form is presented by way of example only, and not in a limiting sense.

Moreover, while I have also illustrated and described herein a particular form of handle, it will be understood that other handles of the type commonly used with paint rollers could also be used, and that no claim is made herein as to any particular roller handle construction. The invention, in brief, resides in the provision of an improved sleeve for fiberglass resin rollers as set forth in the following claims.

What I claim as new and desire to secure by Letters Patent is:

1. A resin roller comprising, in combination, a cylindrical sleeve member integrally formed of a synthetic plastic material and having an end wall enclosing one end thereof, a plurality of V-shaped grooves extending in spaced relation along the outer periphery of said sleeve member, the outers end of successive ones of said grooves being mutually spaced to define therebetween a plurality of land portions, said V-shaped grooves and said land portions each being in the form of a continuous spiral along the length of said sleeve member.

2. A resin roller as defined in claim 1 wherein said grooves are of such size and so spaced that the width of said land portions is less than half of the width of said V-shaped grooves at the outer peripheral surface of said sleeve member.

3. A resin roller as defined in claim 2 wherein the wall thickness of said sleeve member is approximately one-quarter inch, and wherein the depth of said grooves extends just short of the full thickness of said wall.

4. A resin roller as defined in claim 3 wherein said sleeve member is approximately two inches in over-all diameter, and wherein the pitch of said continuous spiral groove is such as to define approximately six grooves per inch as measured along the length of said sleeve member.

References Cited
UNITED STATES PATENTS

| 1,544,601 | 7/1925 | Schade | 29—110.5 |
| 2,563,048 | 8/1951 | Liebelt et al. | 15—562 |
| 2,694,874 | 11/1954 | Coolidge et al. | 101—328 |
| 3,082,459 | 3/1963 | Johnson | 15—230.11 |
| 3,089,180 | 5/1963 | Humphey | 15—562 X |
| 3,131,104 | 4/1964 | Korn. | |
| 3,180,776 | 4/1965 | Hessel. | |

FOREIGN PATENTS

| 802,509 | 10/1958 | Great Britain. |

WALTER A. SCHEEL, *Primary Examiner.*

J. M. NEARY, *Assistant Examiner.*